Jan. 19, 1954

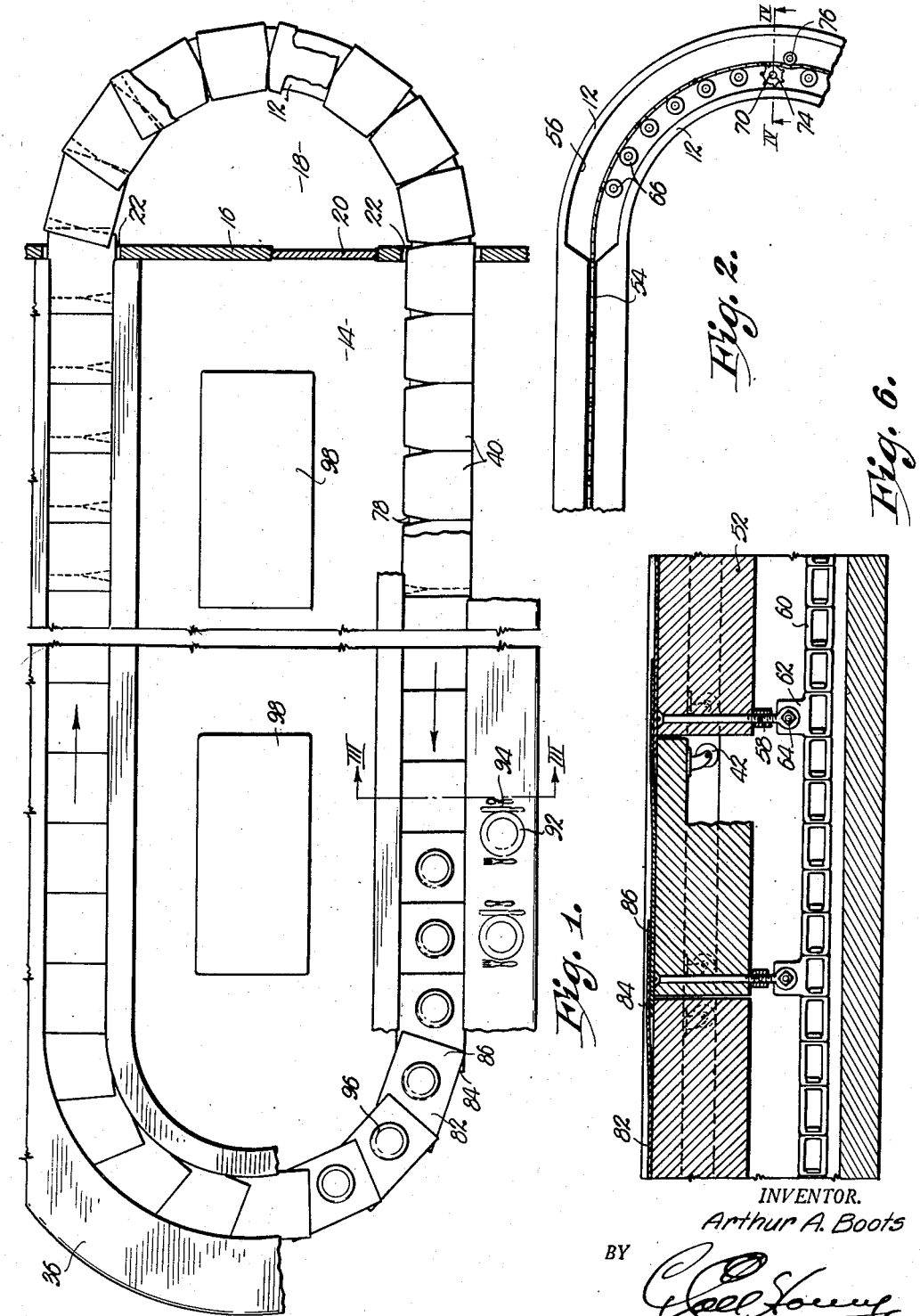

A. A. BOOTS 2,666,519

FOOD SERVING CONVEYER

Filed June 7, 1950

INVENTOR.
Arthur A. Boots
BY
ATTORNEY.

Patented Jan. 19, 1954

2,666,519

UNITED STATES PATENT OFFICE 2,666,519

FOOD SERVING CONVEYER

Arthur A. Boots, Columbia, Mo., assignor to Cafa-Roll, Inc., Carthage, Mo., a corporation Application June 7, 1950, Serial No. 166,677

2 Claims. (Cl. 198—181)

This invention relates to a system for serving food, particularly in restaurants, cafes and other public establishments, the primary object being to provide a continuous presentation of the food to the customers and to return unused portions thereof to a kitchen for handling therein by attendants employed by the establishment.

It is the most important object of the present invention to provide a food serving system in the nature of a continuous track having a series of relatively small mobile carriages resting thereon and provided with structure for moving the carriages in procession around the track, said carriages being adapted to receive plates and bowls of food that are progressively moved to a point accessible to customers and thence into the kitchen for cleaning, replacement or replenishing the supply of food thereon.

Another important object of the present invention is to provide a food serving system wherein the aforesaid continuously moving carriages are each provided with a flat, horizontal plate that extends in one end thereof in lapping relationship with a plate adjacent thereto, whereby to present the effect of a continuous, uninterrupted, movable platform.

Another object of the present invention is the provision of a continuous food serving system having a series of end-to-end, abutting mobile carriages cut-away so as to maintain portions of said edges together as the procession traverses rounded ends forming a part of the supporting track for the food-receiving carriages.

A further object of this invention is the provision of a food-serving conveyor system as above set forth having an endless chain or the like underlying the carriages and coupled therewith through the medium of a tongue depending from each carriage respectively, whereby all of the carriages are moved simultaneously and at the same rate of speed as predetermined by the operator.

A still further object of this invention is the provision of a series of end-to-end mobile carriages mounted upon a continuous oval track, there being a guide slot formed in the track for maintaining the tongues and the carriages in a predetermined path of travel and the carriages additionally being interconnected by a spring for guiding the same around the arcuate ends of the track.

Other objects of the invention include the way in which the continuous actuating chain is guided at the ends thereof by an arcuate row of rollers; the way in which the mobile carriages are provided with small casters that freely rotate and swivel as the same are carried around the track by the endless chain; the manner of forming a counter around a substantial portion of the track and moving carriages for the customers of the restaurant; the way in which the carriages are hidden from view by the aforesaid lapping plates and by a portion of the counter itself; and many more additional minor objects, all of which will be made clear or become apparent as the following specification progresses, reference being had to the accompanying drawings, wherein:

Figure 1 is a fragmentary, top plan view of a food-serving system made pursuant to the present invention, parts being broken away and in section to reveal details of construction.

Fig. 2 is a fragmentary, plan view of a portion of one side stretch and one end stretch of the system showing the same with the carriages entirely removed.

Fig. 6 is a vertical, sectional view taken on line VI—VI of Fig. 3, looking in the direction of the arrows.

Figure 3:
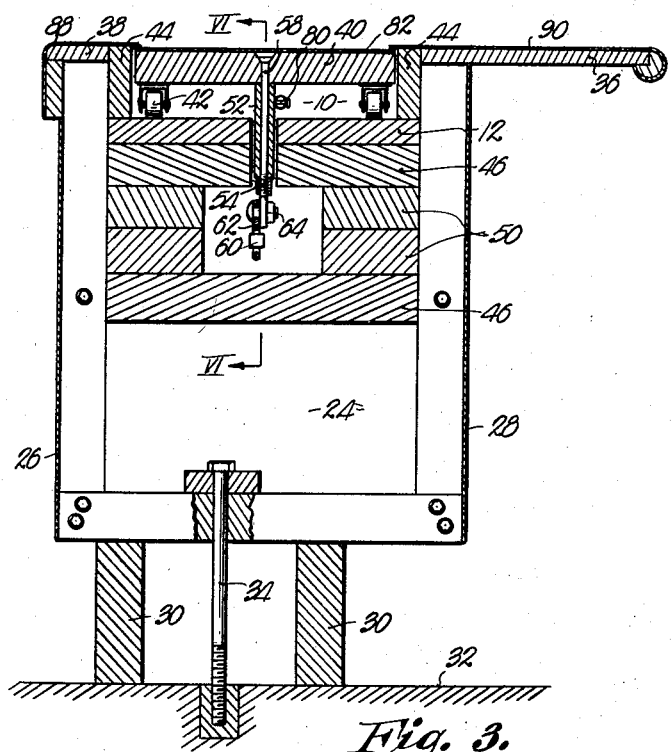
Fig. 3 is an enlarged, transverse, vertical, cross-sectional view taken on line III—III of Fig. 1 looking in the direction of the arrows.

As will hereinafter appear, it is the primary purpose of the present invention to provide restaurant or cafe construction that will eliminate a substantial part of the overhead of the establishment by reducing the number of employees normally found necessary in serving the public. Still further, through use of the system hereof, a relatively large number of customers can be served quickly and easily and in a small space, thereby reducing the size of the building necessary to conduct the operations and increasing the customer turn-over appreciably.

It will also be seen that through use of this system, it is possible to serve "family style" or somewhat in the nature of a cafeteria, whereby the customer may select the food desired and further, it is contemplated that the system be used to permit the customer to eat as much as desired for a given constant price.

As clearly illustrated in the drawings, there is provided a continuous track broadly designated by the numeral 10 and including a continuous horizontal platform 12. While it has been found to be desirable to form the track 12 in the shape of an oval, as illustrated in Fig. 1, it is to be understood that the precise shape of track 10 may be changed within this invention to suit the desires of the restaurant operator.

It is contemplated that a substantial portion of the track 10 be disposed within a dining room 14 on one side of a partition 16, with the remainder of track 10 in a kitchen 18 on the opposite side of partition 16. A swinging door 20 within partition 16, permits passage between rooms 14 and 18. A pair of openings 22 formed in the partition 16, receive the track 10 and its corresponding parts.

The platform 12 forming a part of the track 10, is mounted within a hollow casing 24 having inner and outer vertical walls 26 and 28 respectively and resting upon supports 30 and secured to floor 32 by means of a plurality of bolts or the like 34. A counter 36 extends outwardly from the housing construction 24 above the outermost wall 28, said counter 36 preferably extending entirely around the track 10 within the dining room 14. Suitable trim 38 extends entirely around the uppermost end of the wall 28.

A series of end-to-end, abutting carriages 40 are rendered mobile through the medium of a plurality of caster wheels 42 that rest directly upon and ride along the uppermost face of platform 12. Carriages 40 are disposed between a pair of spaced-apart guide blocks 44 forming a part of the housing assembly 24. Platform 12 is in turn supported by a number of cross pieces 46 and 48, together with intervening spaced-apart fill blocks 50.

Each carriage 40 is provided with a longitudinally extending, depending fin 52 that extends through slots 54 and 56 formed in the platform 12 midway between the longitudinal edges thereof. It is noted (Fig. 2) that the slots 54 are formed in the opposed straight-side stretches of the track 10, whereas the slots 56 are appreciably wider than the width of the slots 54 and are formed at each arcuate end stretch respectively of the track 10.

Figure 4:
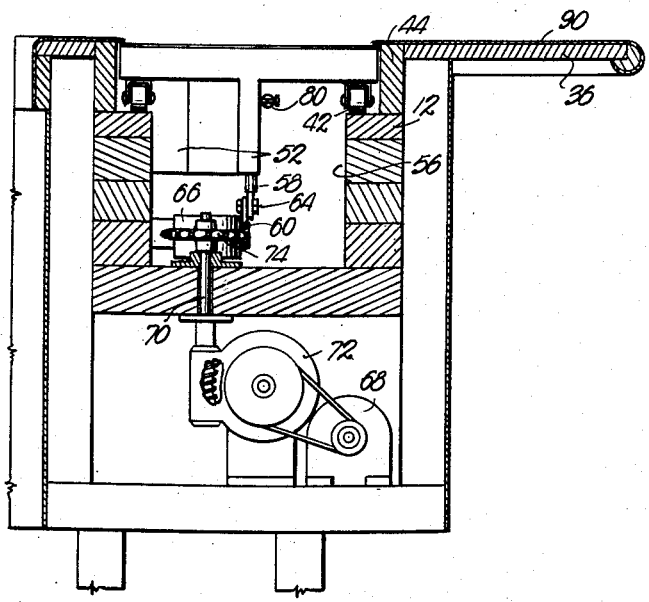
Fig. 4 is a vertical, transverse, cross-sectional view similar to Fig. 3 taken on line III—III of Fig. 2, but showing the entire assembly with the carriages and counter forming a part of the assembly.

Additionally, each carriage 40 is provided with a depending tongue 58 adjacent the forwardmost or leading end thereof, which tongue 58 passes through the fin 52 thereof and couples at the lowermost end thereof directly with a continuous conveyor or chain 60. Chain 60 has certain of its lengths provided with an upstanding, preferably integral, ear 62 for receiving the tongues 58 by means of a bolt or the like 64. The chain 60 is actually supported by the carriages 40 and guided along the straight stretches of the track 10 by virtue of the sliding fit between fins 52 and the slots 54. At the arcuate ends of the track 10 adjacent the relatively wide slots 56 of platform 12, the chain 60 is guided in an arcuate path through the medium of a plurality of spaced-apart relatively small rollers 66 that are mounted for rotation on vertical axes between cross-members 46 and 48. Continuous movement is imparted to the chain 60 and thence to the series of carriages 40 to motivate the latter in procession around the track 10 by means of a suitable prime mover 68 (Fig. 4).

Figure 5:
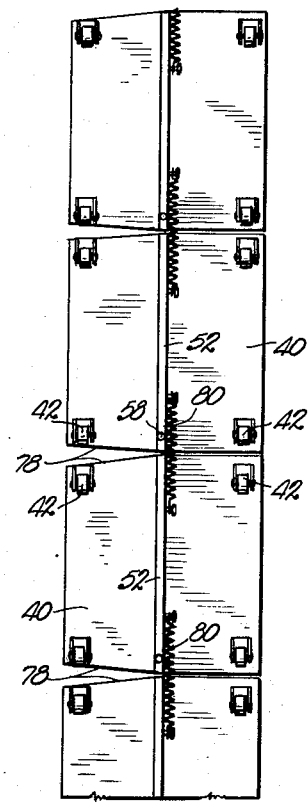
Fig. 5 is a fragmentary, inverted view of certain of the carriages per se.

A vertical shaft 70 is operably connected with a speed reducer 72 that is in turn joined with the prime mover 68. A sprocket wheel 74 on the uppermost end of the shaft 70 is in mesh with the chain 60 and an idler 76 opposed to sprocket 74, holds the chain 60 interlocked with sprocket 74. The abutting edges of the carriages 40 are cut-away as at 78 adjacent the innermost edge of the track 10 (Fig. 5), and the fins 52 of the carriages 40 are interconnected through the medium of a coil spring 80.

Each carriage 40 is provided with a polygonal plate 82 upon the uppermost face thereof, the plates 82 all extending beyond the forwardmost and rearwardmost ends of the carriage 40 as shown in Figs. 1 and 6. The forwardmost extended end of the plate 82, overlaps the leading carriage 40 as at 84 and the rearmost extended portion of the plates 82 projecting in overlapping relationship to the plate 82 next following as at 86. Consequently, the plates 82 hide from view the cut-away portions 78, the springs 80 and all underlying structure. Additionally, as shown in Figs. 1, 3 and 4, the trim 38 and the counter 36, are provided with suitable coverings 88 and 90 respectively that extend in partial overlying relationship to the plates 82.

In operation, each customer is obviously provided with a plate 92, silverware 94 and such additional instrumentalities as cups, saucers, glasses and the like, which are all placed upon the counter 36 as shown in Fig. 1 and through the medium of stools, chairs or the like, the customer eats a meal from counter 36 in the customary manner. Food is placed upon the carriages 40 and particularly upon the plates 82 thereof through the medium of a number of bowls, dishes or the like 96 within the kitchen 18 and in this connection, it is contemplated that bowls 96 be arranged in a number of "sets," each set constituting a complete meal. Through the medium of motor 68 and speed reducer 72, the carriages 40 are placed in motion, continuously and at a predetermined relatively slow rate of speed, for movement as indicated by the arrows in Fig. 1 of the drawing. As one course of the meal moves past a customer, he selects the food desired from the bowls 96 and places the same upon his plate 92, leaving the bowls 96 upon the plates 82 for continuous movement around the track 10 and back into kitchen 18. When the customer desires additional food or added helpings of any particular dish, he need only wait a few moments until another course passes along his plate 92. Through such procedure, the system is rendered "self-service" and the customer is permitted to select the food desired in such amounts as he may wish and in payment at a predetermined constant amount. As the courses of bowls 96 reach the kitchen 18, attendants therein replenish the supply of food or remove the bowls 96 entirely for washing and replace the same with new bowls of food.

One or two attendants within the dining room 14 and particularly confined within the track 10, serve the customers with such standard equipment as plates 92 and silverware 94 as well as water and other drinks, all of which may be stored within cabinets or upon tables 98.

It is seen by virtue of the overlapping nature of the plates 82 and because of the fact that the coverings 88 and 90 overlap plates 82, the effect of all of the plates is that of a continuous moving platform. As the carriages 40 make the arcuate turn adjacent the ends of the track 10, the plates 82 take the position illustrated in Fig. 1 of the drawings, whereas, the edges of the carriages 40 remain in abutting relationship as the same rock or turn, as shown in Fig. 1. The cut-away portions 78 permit such relatively sharp turning of the carriages 40 and such cut-away edges 78 move into abutting relationship at the center of the turn. It is obvious from the drawings and from such explanation of the operation of the assembly that the tongues 58 are necessarily pivotally attached to the carriages 40 and the fins 52 in order to permit such swinging of the carriages 40 relative to the chain 60. The fins 52 hold the carriages 40 and the plates 82 thereon in a straight path of travel until such time as the fins 52 move out of the slots 54 and into the slot 56. At this point, the carriages 40 are guided by the chain 60 which is in turn guided by the rollers 66. Additionally, the carriages 40 are held in following relationship around the arcuate ends of the track 10 through the medium of the coil springs 80 that join fins 52. Springs 80 tend to hold the trailing ends of the carriages 40 against undue lateral swinging on their tongues 58 at the ends of track 10. It has been found that through the use of the rollers 66, the movement of the carriages 40 is relatively steady and continuous with a minimum amount of jerking or irregular movement around the arcuate ends of the system.

It is seen from the foregoing, that a food-serving system of a mechanical nature and continuous in its operation, has been presented that includes apparatus for rolling the food-supporting carriages around a continuous track with all of the mechanical unsightly structure entirely hidden from view.

The plates 82 should be selected from materials that are easily cleaned and polished such as stainless steel, but aside from these plates 82, the entire construction may be made from relatively inexpensive materials.

The system presents an attraction and invitation to the public for quick service and inexpensive meals, since each may eat as much as desired, and further, only such helpings of particular foods as are desired.

Manifestly, many details of construction may be varied without departing from the spirit of this invention and it is, therefore, desired to be limited only by the scope of the appended claims.

Having thus described the invention, what is claimed as new and desired to be secured by Letters Patent is:

1. In a food serving system, a continuous, horizontal track having a pair of opposed, straight side stretches and a pair of opposed, arcuate end stretches; a series of mobile carriages resting upon said track for movement in procession in one direction therearound, each carriage having a leading end and a trailing end; a conveyor underlying the track; a single tongue and an elongated fin depending from and attached to each carriage respectively, the tongues being pivotally secured to the carriages adjacent the leading end thereof, said tongues being connected with said conveyor at spaced intervals on the latter; means presenting a guide slot for the fins coextensive in length with each of said straight side stretches respectively; and resilient means yieldably joining the trailing end of each carriage respectively with the leading end of the carriage next following, for limiting the trailing ends of the carriages against excessive swinging movement as the carriages proceed around the arcuate end stretches of said track.

2. In a food serving system, a continuous, horizontal track having a pair of opposed, straight side stretches and a pair of opposed, arcuate end stretches; a series of mobile carriages resting upon said track for movement in procession in one direction therearound, each carriage having a leading end and a trailing end; a conveyor underlying the track; a single tongue and an elongated fin depending from each carriage respectively, said tongues being pivotally attached to the carriages adjacent the leading end thereof and connected with said conveyor at spaced intervals on the latter; means presenting a guide slot for the fins coextensive in length with each of said straight side stretches respectively; and resilient means yieldably joining the trailing end of each carriage respectively with the leading end of the carriage next following, for guiding the trailing ends of the carriages around the arcuate end stretches of said track, there being an arcuate row of rollers at each end of the track for guiding said conveyor and thereby guiding the tongues and the leading ends of the carriages in a curved path around said ends of the track.

ARTHUR A. BOOTS.

References Cited in the file of this patent

UNITED STATES PATENTS

| Number | Name | Date |
| --- | --- | --- |
| 426,890 | Westphal | Apr. 29, 1890 |
| 689,242 | Stutt | Dec. 17, 1901 |
| 1,505,971 | Rebstock | Aug. 26, 1924 |
| 2,037,815 | Ora | Apr. 21, 1936 |
| 2,168,898 | Christensen et al. | Aug. 8, 1939 |
| 2,193,076 | Preble | Mar. 12, 1940 |
| 2,548,061 | Read | Apr. 10, 1951 |